Nov. 24, 1931.　　　H. P. MIXER　　　1,833,467
CALCULATING MACHINE
Filed March 22, 1927　　9 Sheets-Sheet 4

INVENTOR.
H. P. Mixer
BY J. S. Newton
ATTORNEY.

Nov. 24, 1931.  H. P. MIXER  1,833,467
CALCULATING MACHINE
Filed March 22, 1927  9 Sheets-Sheet 5

Nov. 24, 1931.  H. P. MIXER  1,833,467

CALCULATING MACHINE

Filed March 22, 1927    9 Sheets-Sheet 6

INVENTOR.
H.P. Mixer
BY
J. G. Newton
ATTORNEY.

Nov. 24, 1931.  H. P. MIXER  1,833,467
CALCULATING MACHINE
Filed March 22, 1927    9 Sheets-Sheet 8

INVENTOR.
H.P.Mixer
BY
ATTORNEY.

Nov. 24, 1931.  H. P. MIXER  1,833,467
CALCULATING MACHINE
Filed March 22, 1927    9 Sheets-Sheet 9

INVENTOR.
H. P. Mixer
BY J. H. Newton
ATTORNEY.

Patented Nov. 24, 1931

1,833,467

UNITED STATES PATENT OFFICE

HAROLD P. MIXER, OF EBENSBURG, PENNSYLVANIA, ASSIGNOR, BY MESNE ASSIGNMENTS, TO GARDNER COMPANY, OF EBENSBURG, PENNSYLVANIA, A CORPORATION OF DELAWARE

CALCULATING MACHINE

Application filed March 22, 1927. Serial No. 177,357.

This invention relates to calculating machines and has special reference to improvements in certain details of the calculating machine of Clyde Gardner, Serial Number 718,678, filed June 7, 1924 corresponding to British Patent No. 293,080, and which machine is known to the trade as the "Gardner" and sold on the open market.

One important object of the present invention is to provide a novel mechanism in such a device to prevent a numeral key to be depressed in any bank or where there is already a key depressed after the operating handle has been moved forward and continues to prevent any more keys being depressed in any bank where there is a key depressed until the operating handle reaches a certain predetermined position on its return.

In the apparatus as described in the above mentioned application two counter-mechanisms were disclosed, one of which could be brought into operative relation with the mechanism controlled by the numeral keys when one counter-key was depressed while the other could be brought into operation when a second counter-key was depressed. Also both counters could be brought into operation simultaneously by the depression of a third counter-key. To cause addition a key was provided and upon its depression the actuation of the numeral key would cause addition on the totalizing mechanism and a second key when depressed would cause subtraction.

A second important object of the invention is to provide an additional counter key which is preferably denominated "the add-subtract" key which when actuated will operate certain connecting mechanisms whereby, addition will occur on one counter while subtraction will occur on the other counter, or, in other words, whereby both counters are brought into operation in such positions that they actuate in different directions.

A third important object of the present invention is to provide a device whereby a symbol or character will be caused to print in rear of items run into the machine when (a) the add subtract key has been depressed in conjunction with the add key (b) when the add subtract key has been depressed in conjunction with the subtract key (c) when the both counter key has been depressed in conjunction with the add key and (d) when the both counter key has been depressed in conjunction with the subtract key.

A fourth important improvement of the invention is to provide a device whereby the total and subtotal keys will be locked in their normal position when the add-subtract key or the both counter key is depressed and this lock being preferably called the "total-counter control lock."

A fifth important object of the invention is to provide a mechanism in such a device whereby the operating handle cannot be moved after the total or subtotal key has been depressed until such time when the totaling mechanism has completed its movement.

A sixth important object of the invention is to provide a mechanism so designed and constructed to prevent the rack arms from rotating in a downward direction during the return stroke of the operating handle but allowing them to turn in a downward direction on the forward stroke of the operating handle.

Other objects of the invention will be developed in the course of the detailed description of the various parts connected with the improvements above mentioned, this detailed description being largely confined to the particular features of the improvements and upon the completion of the detailed description these improvements will be specifically claimed.

In the accompanying drawings like characters of reference indicate like parts in the several views and, as far as is practical the same reference characters have been used in this application as were used in the aforesaid application of Gardner, so that the present invention may be more clearly understood.

In these drawings.

Considering first the mechanism which is preferably called the numeral key lock. This mechanism prevents any numeral keys from being depressed in any bank or column when there is a key depressed, after the operating handle has been slightly moved forward, and prevents numeral keys depressed from being restored until after a certain predetermined time on the rearward movement of the operating handle. This mechanism being shown in Figures 1 to 7 inclusive.

Figures 1, 17:
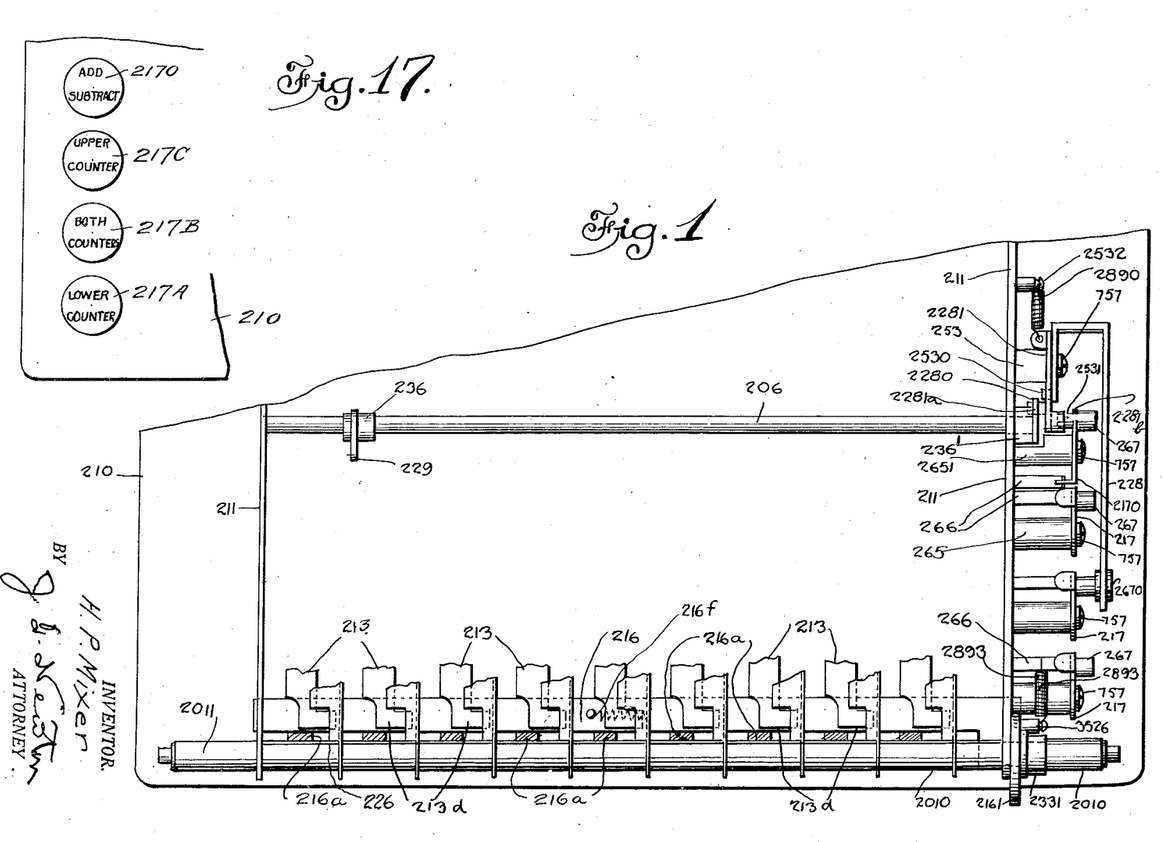
Figure 1 is a view looking from below, of the front portion of the keyboard and key mechanism, the view indicating the lever lock device which is only released upon complete depression of the numeral keys.
Figure 17 is a detailed view of a portion of the top of the machine showing the location of the add-subtract key.
Figures 2, 3, 7:
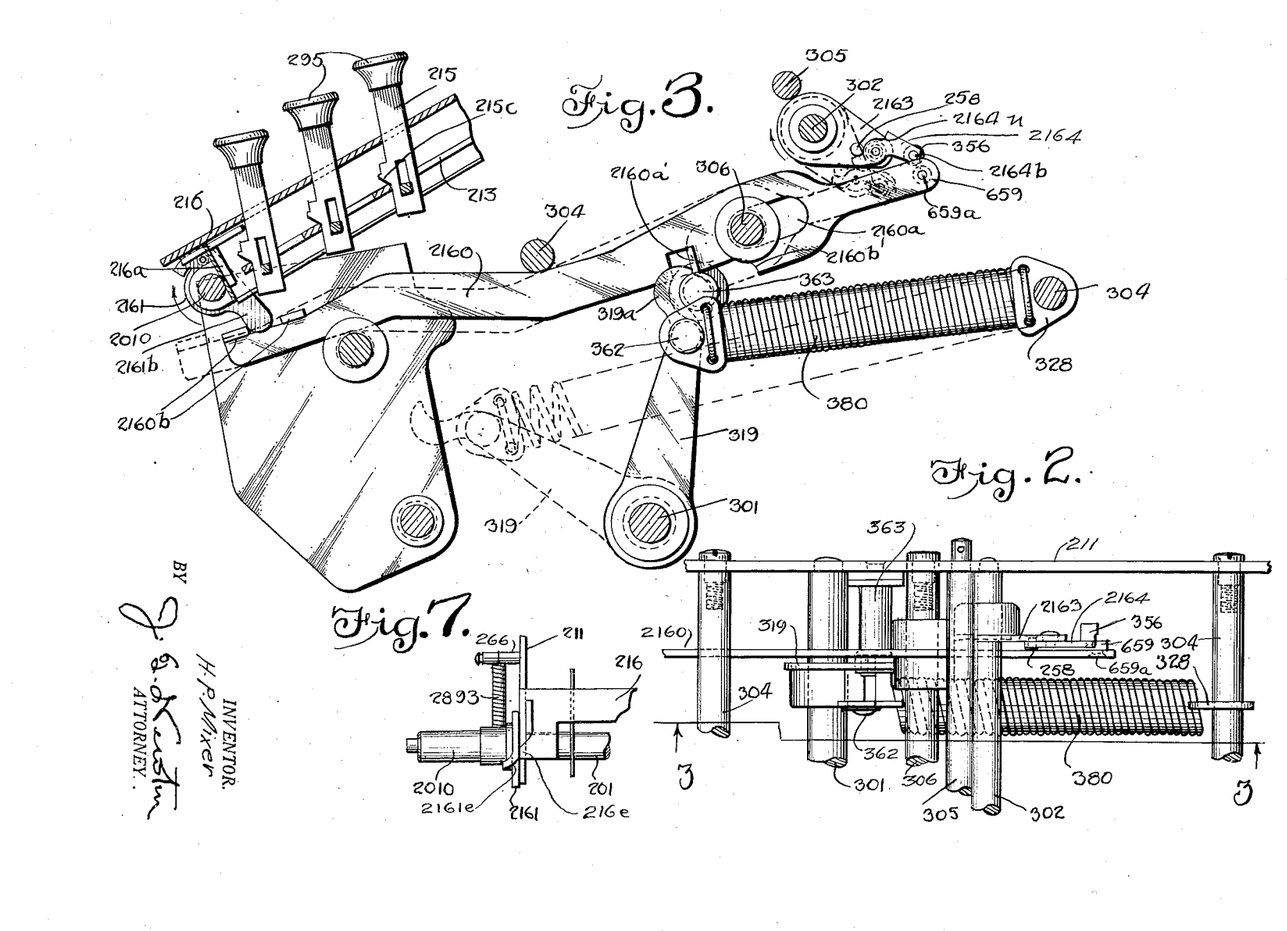
Fig. 2 is a plan view of a portion of the left hand side of the machine showing part of this mechanism.
Fig. 3 is a detailed section through this left hand side on the line 3—3 of Fig. 2.
Figure 7 is a top plan view of the numeral key lock box mechanism shown at the lower right hand corner of Figure 1, the key board plate being removed.
Figures 4, 5, 6:
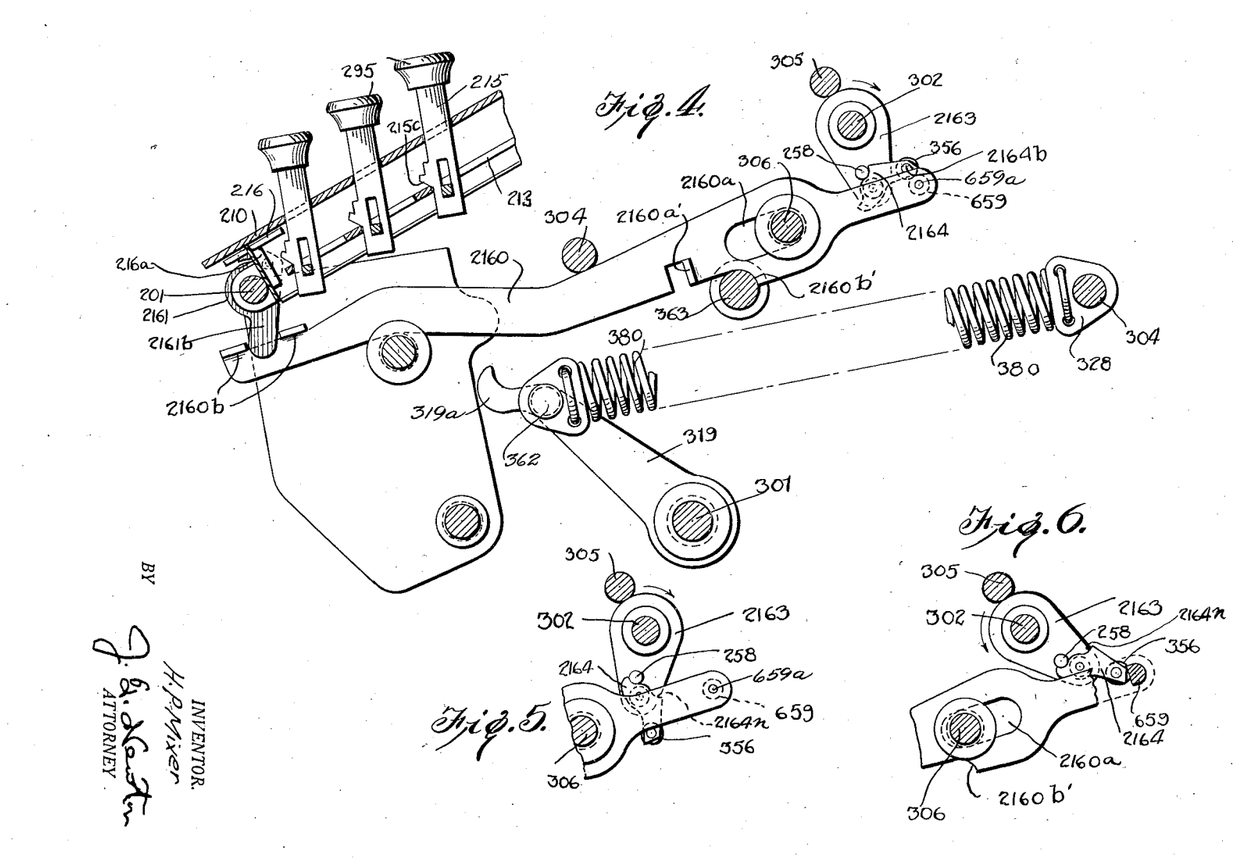
Fig. 4 is a view similar to Fig. 3 showing the full release position of the device.
Fig. 5 is a detailed view of a portion of the mechanism shown in Figure 4 and illustrating another position of a latch associated therewith.
Fig. 6 is a view similar to Fig. 5 showing a still further position of the latch mechanism.

In these figures there are disclosed a pair of side plates 211 which are carried on the under side of the key-board plate 210. In the forward ends of these plates as more clearly shown in Figures 1, 3 and 4, is mounted a shaft 201 the right hand end of which in Figure 1 is denoted 2010 and which has journalled on it a cam arm 2161 which through its caming face 2161e operates the locking bar 216, Figs. 1 and 3, in a transverse sliding movement in the opening in the side plates 211. On the bar 216 is a series of lugs 216a which when in a released position project into the path of the detent strips 213 so that they cannot be moved forward. The detent strips 213 are operated through the caming surface 215c (Fig. 3) of the key stems 215. Therefore when the machine is normal and the lock not released the key stems 215 may be depressed and restored at will as the strip 216 is not in the path of the detent strip 213. The cam lever 2161 is operated through the sliding bar 2160, Fig. 3. This bar 2160 has an elongated slot 2160a that controls its necessary travel on shaft 306 and is shown in its normal position in Figure 3 in full lines and released position in dotted lines.

301 is the main operating shaft of the machine as shown in said Gardner application to which the operating handle is attached. Fixed to the shaft 301 is a rock arm 319 which carries on one end a stud 362 in Figure 3 to which one end of a spring 380 is attached, the other end of the spring being provided with a plate 328 which is attached to a fixed shaft or bar 304 of the machine. Thus, when the shaft 301 is oscillated the arm 319 is turned forwardly as shown in dotted lines in Figure 3. The cam lever 2161 is provided with a tail or projection 2161b which engages between a pair of lugs 2160b formed on the bar 2160. The arm 319 has at its upper end a hook-shaped portion 319a, Figure 4, which normally engages a pin 363 so that as the spring 380 contracts it is stopped from further rearward movement. This cam lever 2161 comprises a face cam, a projection 216e on the bar 216 engaging this face cam. The face cam has a bevelled notched portion 2161e into which the projection 216e moves when the cam lever is rotated in one direction and out of which said projection is forced upon movement of the cam lever in the opposite direction, which moves the bar 216 longitudinally in one direction while a spring 216f holds the bar 216 against the cam. At 306 is a shaft and the bar 2160 has a slot 2160a through which the shaft 306 extends and the bar moves on this shaft and is further provided with a shoulder 2160b' adapted to engage the stud 363 when the bar moves forward. A shaft 304 keeps the bar from riding upward. At 302 is a shaft lying beneath a shaft 305 and rearwardly thereof. On the shaft 302 is fixed a rock arm 2163 and on the outer end of this rock arm is pivoted a latch member 2164 which has one end engageable with a stop 258 while the other end is provided with a roller 356 pivoted or journalled on a pin 2164b. At the rear end of the bar 2160 there is mounted a roller 659 which is carried on a pin 659a. In addition, the bar 2160 is provided with a lug 2160a' which is engageable by the part 319a on the arm 319.

In the operation of this improvement under normal conditions the arm 319 is held rearwardly as shown in full lines in Figure 3. Under these conditions the forward member 2160b engages the projection 2161b and draws the same backward against the influence of the spring 2893. The result of this is that the lugs or projections 216a are displaced laterally from the key bars 213 and consequently these bars can move downwardly and forwardly under the influence of the cam portions 215c of the keys 295. However, if the shaft 301 be rocked forward to any marked degree by the operating lever then the bar 2160 will move forward and cause the cam lever 2161 to rock slightly so as to allow spring 216f to move bar 216 to the right in Fig. 1 and the projections 216a in front of the bars 213 and thus prevent forward movement of such bars. Consequently the keys 295 cannot be displaced under these conditions since; in order to depress such keys the bars 213 must be moved forwardly. At least these keys cannot be depressed to afford effective operation because the cam surfaces 215c are of such nature that the keys must be fully depressed before they can be locked in depressed position by the bars 213.

Upon extreme forward movement of the operating lever 319 and consequent extreme forward movement of the bar 2160 then the following movements in the other mechanism take place. In the first place the forward projection 2160b on the bar 2160 moves forwardly which permits, under the influence of the spring 2893, the cam member 2161 to move to such position that the projections 216a of the member 216 are moved into alinement with the bars 213. Consequently these bars are prevented from moving forwardly and this prevents the depression of a key 295. Now the projection 2161b, at the same time, draws the bar 2160 forwardly as shown in Figure 4 so that the part 2160b' engages the shaft or lug 363, thus preventing any further movement of the bar 2160. Simultaneously with this movement of the bar 2160 the pawl 2164 is rocked into the position shown in Figure 4 by engagement of the roller 659a with the end of the pawl. In this position of bar 2160 the shoulder 2164 contacts with the stop 258 and is stopped in its upward movement. On continued movement of arm 2163 in the direction of the arrow, roller 356 will drop behind roller 659, then as arm 2163 reverses its direction 356 will come against 659 and move bar 2160 to full line position in Fig. 3. It will be observed that the bar 2160, by reason of the slot 2160a can move freely on the shaft or stud 306 induced by the spring 2893 into the position shown in dotted lines in Figure 3, then when arm 2163 reverses its motion, through the reversal of the shaft 302, the roller 356 having dropped as in Figure 5 and lies in front of the roller 659, thereupon allowing the operating lever controlling the shaft 301 to move backwardly the roller 659 lying rearwardly of the roller 356 which again assumes the position shown in Figures 3 and 6 ready for a new operation. The shafts 301 and 302 of the instant apparatus correspond respectively with the shafts similarly indicated in the aforesaid application of Clyde Gardner. In the apparatus of that application the shafts 301 and 302 are positively oscillated in opposite directions. Consequently, in the present instance, when the shaft 301 is turned to move the operating lever 319 to the forward position indicated by dotted lines in Fig. 3, the shaft 302 is turned in the opposite direction as indicated by the arrow. This movement of the shaft 302 turns the arm 2163 and the pawl 2164 downward, as indicated in Fig. 5. When the shaft 301 is reversed there is a simultaneous reversal of the shaft 302, with a corresponding movement of the arm 2163. In its reversal, the arm moves to the right and upward from the position shown in Fig. 5. In this movement the pawl 2164 engages the abutment 659, as shown in Fig. 6, and the sliding bar 2160 is positively retracted to its initial position against the action of the spring 2893, operating through the arm 2161b engaging the forward end of the sliding bar.

In this machine, the keys 295 are released from their detents 212 during the return stroke of the operating lever but prior of course to the completion of such return stroke. It is therefore necessary to get bar 216 back to normal before part 319 is fully returned. It is for this reason that the bar 2160 is operated by pawl 2164 in return to normal rather than by 319a. However, on the forward stroke, bar 2160 must be free to travel, and for this reason pawl 2164 becomes ineffective at the end of the return stroke and then element 319a must be relied upon to hold bar 2160 rearward until the next operation of the operating lever.

We will now consider that portion of the mechanism which deals especially with the improvement in the means for ensuring full operation of the totaling mechanism before the operating handle can be moved.

Figure 8:
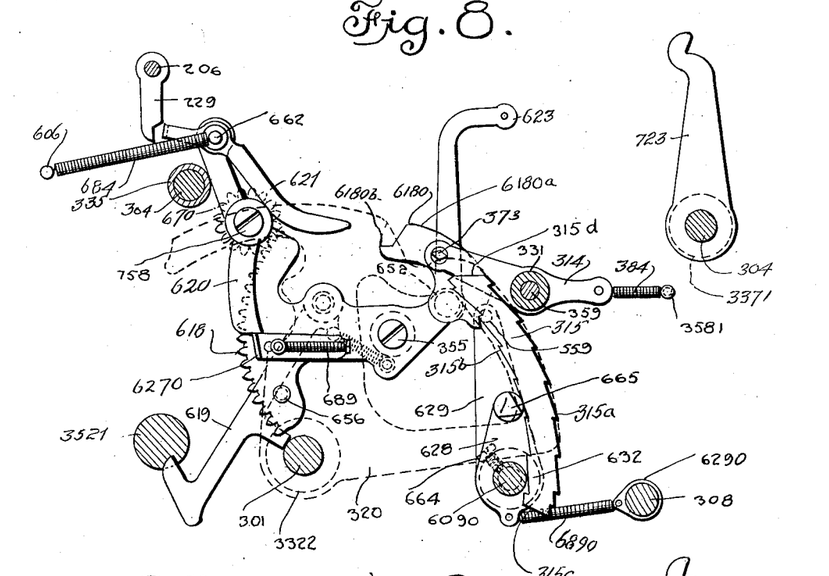
Figure 8 is a fragmentary side elevation of the operating handle lock for total and subtotal keys forming parts of the improvements of this invention, the mechanism being shown in one position.
Figure 9:
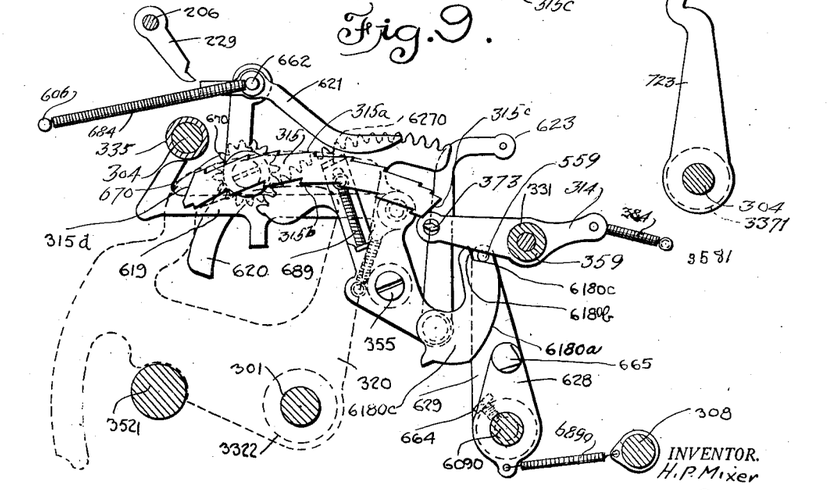
Figure 9 is a view similar to Figure 8 with the parts moved to another position.
Figure 10:
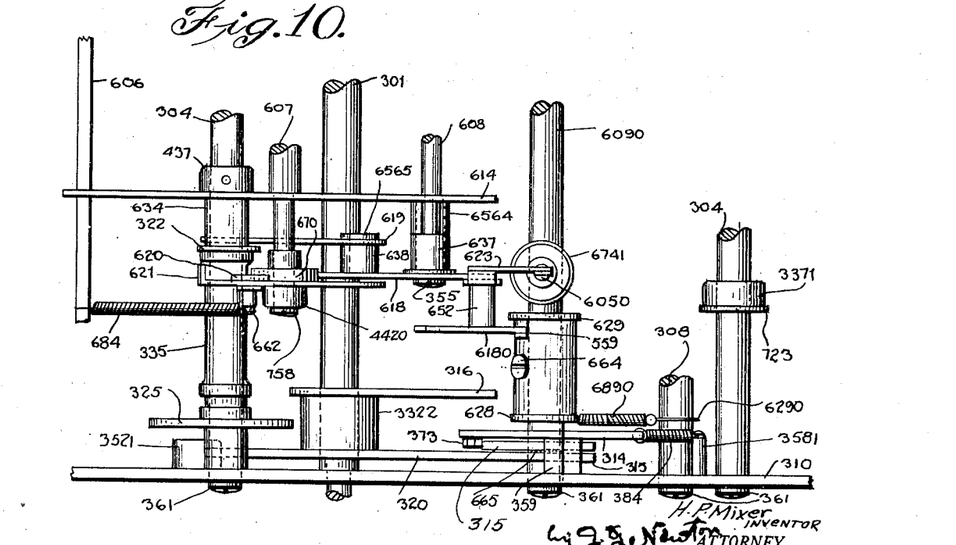
Figure 10 is a plan view of some of the lock parts shown in Figures 8 and 9.

This mechanism is especially shown in Figures 8, 9, and 10. On the operating shaft 301 is fixed the cam 320 and fixed to this cam is the ratchet 315 which works in conjunction with the pawl 314. These parts insure complete forward and rearward strokes of the operating handle as explained in previous application of Clyde Gardner. When the total or subtotal key is depressed that total mechanism is released and the gear segment 618 moves upward and rearward in a clockwise direction as is also explained in the prior application of Clyde Gardner. In this new mechanism preferably called the total mechanism operating handle lock, a cam 6180 has been fixed through the stud 652 to the tail of the gear segment 618. This cam has two camming faces 6180B and 6180C and the dwell 6180A. On the fixed shaft 6090 is the hub 632 and is positioned by the screw 664 which enters a recess in shaft 6090 but allows the hub to turn freely. On the left end of hub 632 is fixed the arm 629 the upper end carries the stud 559 and is in mesh with the cam 6180. On the right end of the hub 632 is fixed the arm 628 the upper end carrying the milled stud 665. The lower end of this arm 628 is fastened to a tension spring 6890, the other end being fastened to the shaft 308 holding this assembled unit in a forward position so that the stud 559 rests against the cam 6180. The milled stud 665 is so positioned in the arm 628 that a certain amount of rearward movement will cause it to mesh with a certain tooth on the inside of ratchet 315. In the regular operation of items in the machine this mechanism remains at rest and stud 665 is out of mesh with the ratchet 315. Upon the depression of total or subtotal key the total mechanism is released and the cam 6180 turns downward in a clockwise direction the camming surface 6180C moving stud 559 rearward which in turn through the assembled parts 629, the hub 632 and the arm 628 moves stud 665 into mesh with a certain tooth of the ratchet 315, thereby locking the operating handle through cam 320 and the shaft 301. The handle is thereby locked until the stud 559 passes off the dwell 6180A onto surface 6180B causing the stud 665 to pass out of mesh with the ratchet where it remains, until the handle is pulled forward moving the ratchet 315 beyond the stud 665 where the total mechanism is picked up and restored at the same time restoring the locking mechanism as the ratchet 315 is out of the way to interfere with stud 665 and the mechanism is again normal and ready to repeat the movement or to stay at rest for regular operation of items on the machine.

Figure 11:
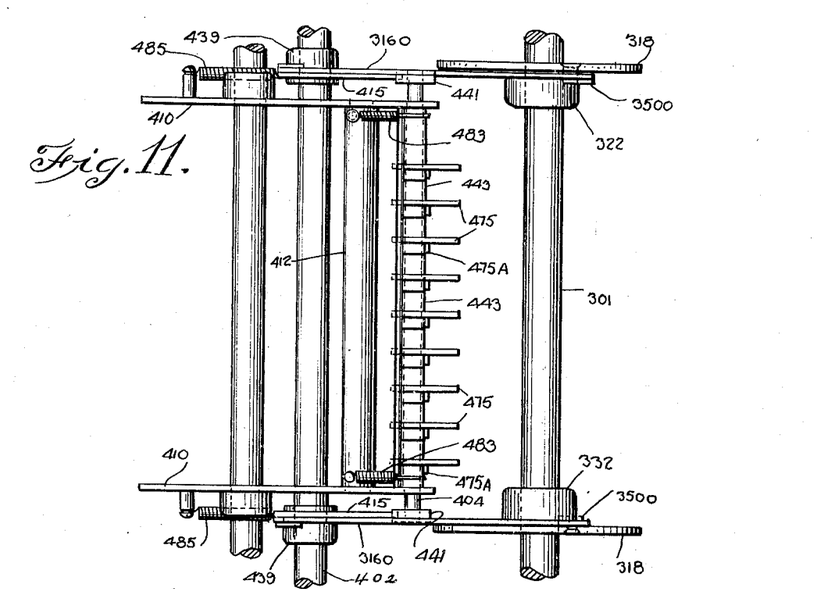
Figure 11 is a plan view of a rock arm lock mechanism forming one of the improvements of this invention.
Figure 12:
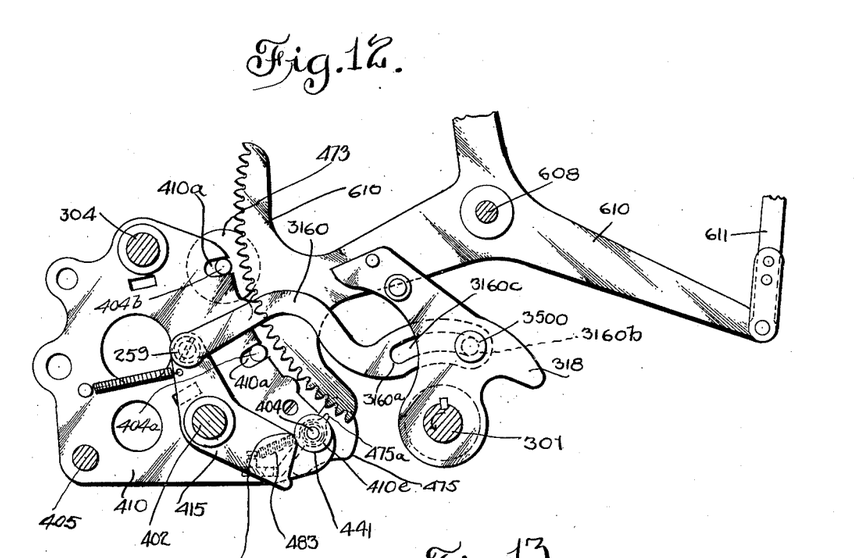
Figure 12 is a side elevation of the rock arm lock mechanism showing one position thereof.
Figure 13:
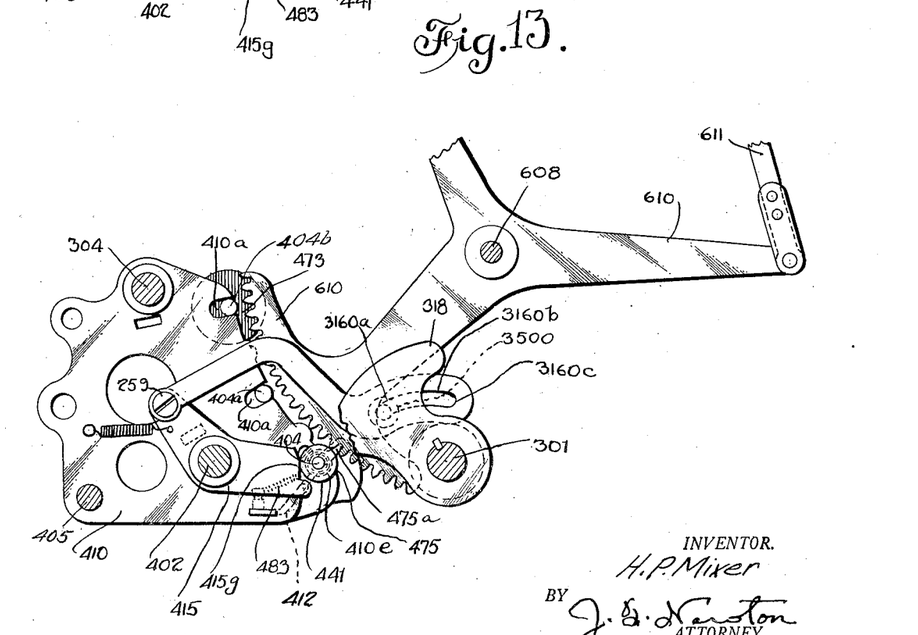
Figure 13 is a view similar to Figure 12 showing another position thereof.

Considering the improvement in the "rack arm lock" reference will be made to Figures 11, 12 and 13. In the lower slot of the accumulator end plate 410 is the shaft 40 which extends across accumulator side plates 410. On this shaft is a series of one-tooth gear latches 475 which have a projection or tail which rests upon the detent plate 412 by gravity. This detent plate extends between the plates 410 (see Fig. 11). On the ends of the shaft 404, Fig. 11, are fixed the rolls 441 which are in line to mesh with the cams 415, one at either end of the shaft. The cams 415 rotate on the shaft 402 and are operated from its upper end through the stud 259 and the link 3160. The rear end of the link 3160 has an elongated slot through which the stud 3500 travels, the stud 3500 being fixed in the cam 318 and the cam 318 being fixed to the main operating shaft 301. The normal position of this locking mechanism is shown in Figure 12, the one-tooth ratchets 475 being out of mesh. When the operating handle is moved forward the stud 3500 moves with the cam 318 through the slot 3160C until it meets up with the end 3160A, during which time the rack arms 610 have moved downward to their respective stops and the remaining movement of the stud 3500 carries the link 3160 forward, rotating the cam 415, thereby moving rolls 441 forward and positioning the one-tooth ratchets 475 in mesh with the rack arms 610. In this position of a locking mechanism as shown in Figure 13 it can be seen that the rack arms 610 are locked from any further downward movement as the one-tooth gear 475 can only be rotated in an anticlockwise movement. On the return stroke of the operating handle the cam 318 returning to its normal position moves the stud 3500 through the slot 3160C until it meets up with the end 3160B during which time the rack arms have moved upward to their normal position and the one-tooth gears 475 have acted as latches. Now the stud 3500 carries the link 3160 rearward to its normal position again, thereby rotating cam 415 so that it allows the roll 441 to move downward, thus bringing the one-tooth gears 475 out of mesh with the rack arms 610 and the mechanism is again at normal.

We will now consider the operation of the add-subtract key and the effect it has on the rest of the mechanism.

In the prior Gardner application before referred to there was provided an upper counter controlled by an upper counter-key, a lower counter controlled by a lower counter-key, and a third key positioned between the upper and lower counter-keys which threw both of the counters into operation. Also the operation of these counters was effected, upon depression of one or the other of these keys, by the rotation of certain cam members so that one or the other or both of the counters were thrown into operative relation to a toothed segment, the effect being to revolve each counter in the same direction, whereby subtotals would be run into one counter and full totals in the other. In the prior application the idea, as therein expressed, was involved in the actuation of the sub-totaling and full totaling counters. There was no arrangement for simultaneously adding and subtracting but in the present improvement the idea is to provide a fourth key by which the upper counter is thrown into such position that it will revolve in the opposite direction from that of the lower counter thus effecting subtraction on one counter while addition is effected on the other counter. This key is arranged just above the counter control keys on the lower left hand corner of the machine. Figures 14 to 18 inclusive show the construction of this portion of the device. This additional key is shown at 2170, Figures 17 and 18, and is provided with a slot 2170a wherein is a suitable stud to limit the movement of the key. The lower end of the stem of this key engages a lug 4162, Figures 14 and 18 formed on the plate 416 and since the slot 2170a is of considerably greater length than the slots in the keys 217A, 217B and 217C, Figure 18, complete depression of the key 2170 will cause considerably greater downward movement of the plate 416 with the result that the gear 474 which actuates the upper counter control cam will be rotated to move the cam to subtracting position.

Figures 18, 19, 20:
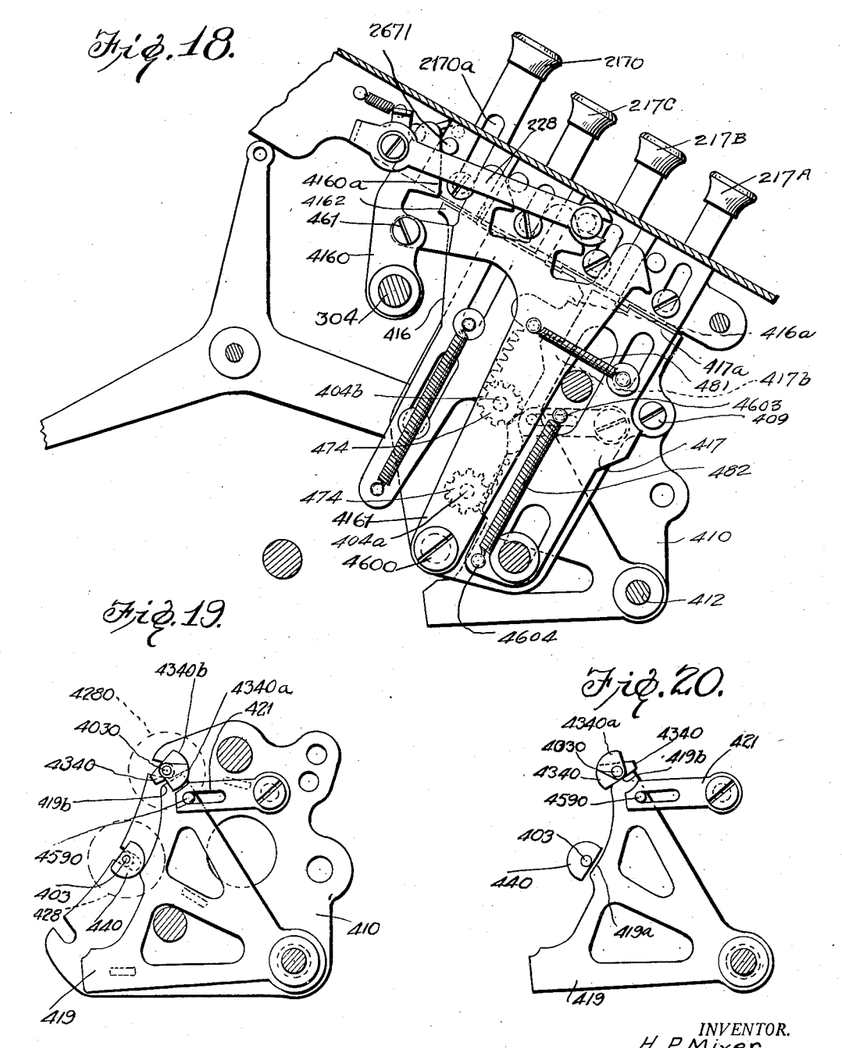
Figure 18 is a detailed view of part of the add-subtract mechanism.
Figures 19 and 20 are detailed views of some of the parts of the add-subtract key mechanism.

It will be remembered that in the prior application of Clyde Gardner, the counters were directly operated by the cams 419 in Figure 19 meshing with cams 440 and 438 which are fixed to the accumulator gear shaft 403 and controlled to be in an operative or inoperative position through a connecting shaft to the gears 474 which are in turn controlled by the rack plates 416 and 417 and these plates operated from the counter keys.

In the present improved application in Figure 19 new cam 4340, being shown, have replaced the cams 440 and 438 on the upper counter gear shaft and a new auxiliary cam 421 added which is operated by the stud 4590 and driven by cam 419. The new cam 4340 differs from the Gardner cam by having two camming surfaces denoted as 4340A and 4340B. The surface 4340A in line to mesh with the surface 419B of cam 419 and the surfaces 4340B of cam 4340 in line to mesh with the auxiliary cam 421. Upon depression of the upper counter control key 217C the rack plate 416 is moved downward rotating the gear 474 which turns the cam 4340 to a position so that the surfaces 4340B mesh with the cam 419 while the surfaces 4340A are not effective with cam 421 and the upper accumulator is caused to be actuated as in the prior Gardner application. When the key 2170 is depressed it moves the rack plate 416 through the lug 4162 a greater distance thereby rotating the gear 474 of the upper accumulator a greater distance. This greater travel rotates the cam 4340 to a new position in which the surfaces 4340B have passed beyond their meshing position with the cam 419 and are now not affected by the cam surface 419B but the camming surfaces 4340A of the cam 4340 have been positioned or rotated to be in mesh with the auxiliary cams 421 and as the auxiliary cam 421 when functioning causes the accumulators to be in an operative position on its upward movement, and the regular cam 419 when functioning causes the accumulators to be inoperative on its upward movement and the cam 421 is driven by the cam 419 and both travel in the same direction, therefore, the camming surfaces 4340A and 4340B cause the upper accumulator to be actuated in opposite directions. The depression of the key 2170 also brings the lower counter into operative position by the projection on the rack plate 416 and 416A which meets up with a projection or tooth on the rack plate 417 and 417B and carries it downward causing the gear 474 to rotate and thereby it can be readily conceived that the add-subtract key brings both counters into operation opposed to one another while both counter keys bring both counters into operation to actuate in unison.

Figure 14:
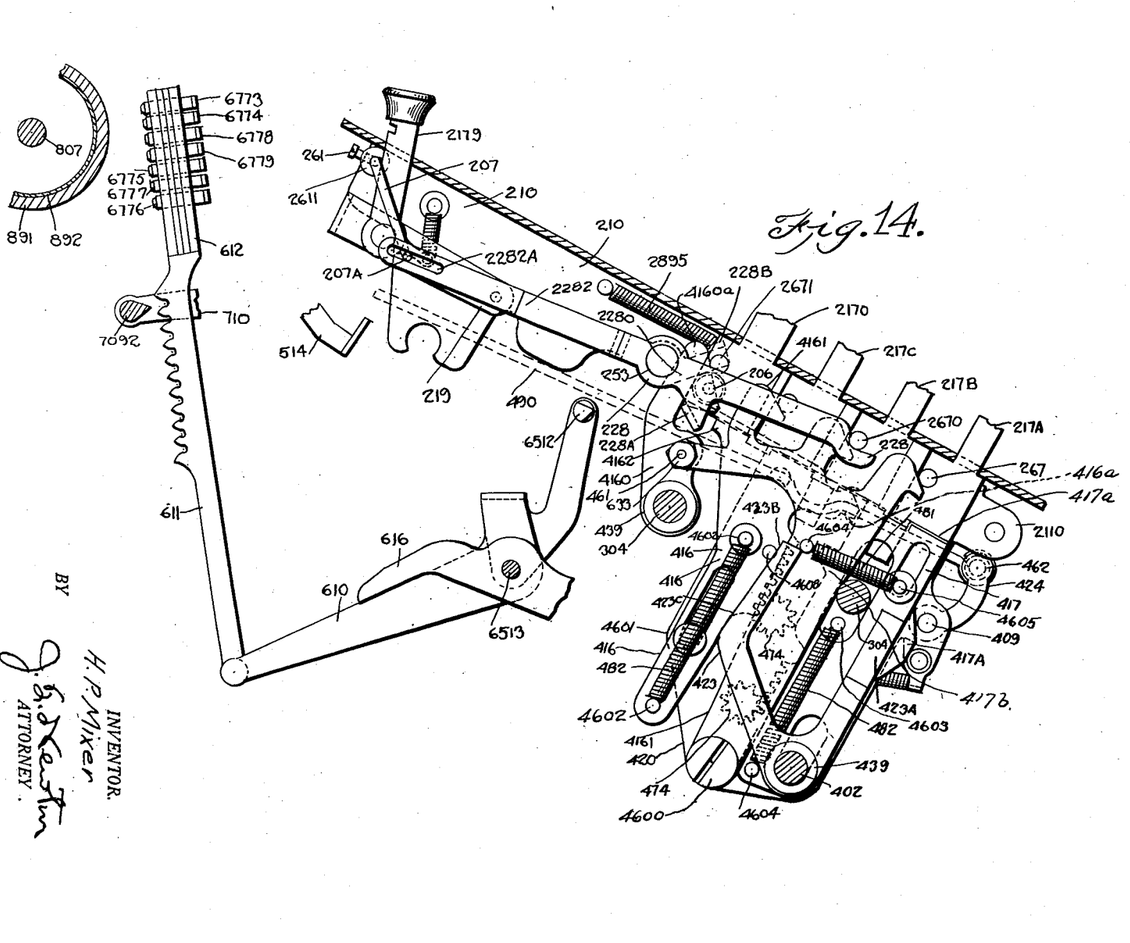
Figure 14 is a side elevation showing one side of the add-subtract key mechanism.
Figure 15:
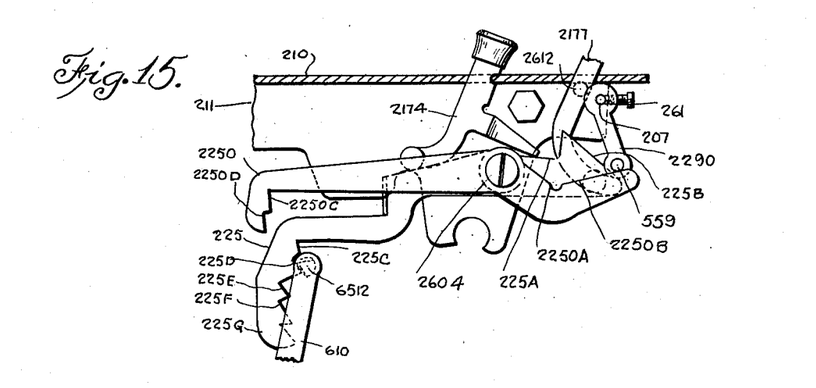
Figure 15 is a detailed side view of the add-subtract key mechanism from the opposite side.
Figure 16:
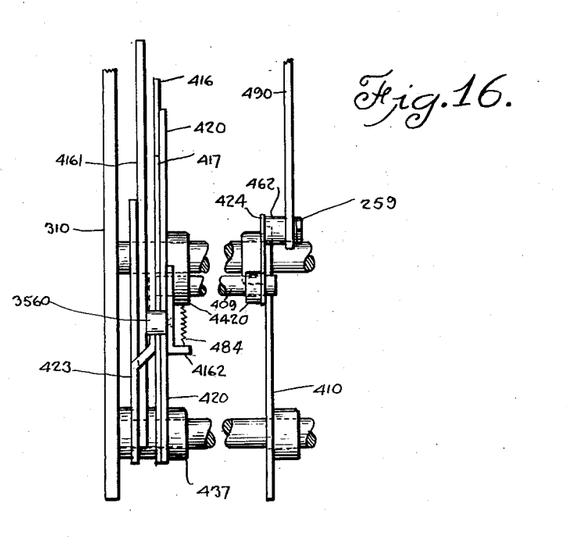
Figure 16 is an end view of part of the add-subtract key mechanism.

Considering that part of this invention which is an improvement in the character printing, Figures 14 and 15 will be referred to. As explained in the prior application of Clyde Gardner, a type bar holding the character type, said bar being under spring tension is at all times ready to move upward and this movement is controlled through the stud 6512 in the arm 610 as the stud 6512 meshes with the index arm 225, Fig. 15 which has several steps, each one allowing more travel to the stud 6512 than the step before it.

In this improvement two index arms have been employed, 225 and 2250, oscillating on the stud 2604 which is fixed in end plate 211. The index arm 225 differs from the corresponding one in said Gardner application in that it has a tail-like portion added to it which has a camming surface as at 225B in Figure 15. The index arm 2250 is new in my improved mechanism and has two steps or indexing surfaces shown at 2250D and 2250C and a camming surface at 2250B. Through the rear end of the keyboard extends a shaft 207 crosswise which rotates in the end plates 211 and on the right-hand end of this shaft 207 is fixed by a set screw 261 an arm 2290 which has a stud 559 and this stud meshes with the camming surfaces 2250B and 225B of the index arms and positions them. The left end of the shaft 207 is bent in the form of a crank as shown in Figure 14 and the extreme end of the crank at 207A extends through the slot 2282A of the arm 2282 which is offset and is fixed to the arm 2280. The arm 2280 oscillates on a stud 253 which is held in the end plate 211. This arm 2280 has a surface as at 228 which comes in contact with a stud 2670 in the both counter key. The arm 2280 also has a camming surface as at 228A which is in the form of an ear bent at the correct angle to work in conjunction with the stud 2671 which is in the add-substract key and when the add-subtract key is depressed the stud 2671 is carried downward and as it comes in contact with the ear 228A it carries it downward also thereby causing the arm 2280 to turn on its stud and travel in a clockwise direction, at the same time carrying the arm 2282 in an upward direction which turns the shaft 207 through its crank at 207A in the slot 2282A. The shaft 207 turning changes the position of the arm 2290, Fig. 15, and as the stud 559 demeshes with the index arms at 2250B and 225B it allows 2250 to drop into an operative position through gravity and carries the part 225 upward to an idle position. When the add-subtract key is released the parts just described return to their former position and the index arms change positions. On the index arms the surfaces 225A and 2250A which work in conjunction with the add key and subtract key as described in the prior application. The character type are positioned in the type bar 611 to correspond to the respective step on the index arms and the type bar is positioned to the printing mechanism in the same manner as previously explained in the Gardner application. Upon depression of the both counter key the same operation occurs and same parts positioned by the stud 2670, Fig. 14, in the both counter key coming in contact with the arm 2280 at the point 228 and carries the arm 2280 downward to the same position as does the stud 2671 the distinction on the recording tape between the two keys being taken care of by the two color ribbon as the both counter key prints in black and the add-subtract prints in red.

We will now consider that improvement of this invention, preferably called the "total counter control lock" best shown in Figures 1 and 18. It will be remembered that in said prior application of Gardner, when the total or subtotal key is depressed the crank shaft 206 was turned in the side plate 211 and on this crank shaft 206 was the latch 229, Fig. 1 which released the total mechanism.

In the present improvement of this invention the crank shaft 206 extends crosswise through the keyboard and journals in both end plates 211. The left end of this crank shaft 206 as shown in Fig. 1 works in conjunction with the total and subtotal keys the same as in the prior Gardner application. On the extreme right-hand end of the shaft 206 which extends through the side plate 211 is fixed an arm 2280, Fig. 1, through the hub 236' which is positioned to work in conjunction with an ear 2281a on the flipper 2281. This flipper 2281 also has an ear as at 2281b which comes in contact with the stud 2531 which is in the add-subtract key. This flipper is under tension of the spring 2890 which is held by the stud 2532, the spring tension having a tendency to keep the flipper 2281 out of mesh with the arm 2280 and this flipper rotates on the stud 253 which is fixed on the side plate 211, to the outside of this flipper and on the same stud 253 rotates the U-shaped arm 228. The forward end of this arm is slotted and is operated by the both counter control key by the stud 2670. In the opposite end of this arm is fixed the stud 2530 which is also in a position to come in contact with the flipper 2281. Now it will be seen that when the both counter key is depressed it rotates the arm 228 through the stud 2670 and in turn the stud 2530 carries the flipper 2281 in a downward motion to such extent that a projection or ear falls in the path of the arm 2280 so that the shaft 206 cannot be rotated, thereby locking the total and sub-total key from being depressed. When the add-subtract key is depressed the stud 2531 is carried downward and contacting with the projection or ear 2281b of the flipper 2281, causing it to be carried downward so that its projection falls in the path of the arm 2280 with the same result of that of the both counter key, while the arm 228 remains in its normal position.

Having thus described the invention, what is claimed as new, is:

1. In combination, a key having a shank provided with a bar-actuating surface, a bar having a portion engageable by said surface to move in accordance with the movement of the key, a second bar having a portion adapted to restrain the first bar from movement by the key, a spring operable to move the second bar to position said portion in restraining position with relation to the first bar, a cam normally positioned to hold the second bar against the action of its spring to position said portion in nonrestraining position with relation to the first bar, a spring for moving said cam from normal position, a lever, a spring normally maintaining the lever in an initial position, and a slidable member engaging the cam and engaged by the lever in the initial position of the latter to hold the cam against the action of its spring to maintain the second bar in nonrestraining position, said slidable member being released by the lever when the latter is moved from its initial position, the released member permitting the cam to respond to the action of its spring to effect movement of the second bar to restraining position with relation to the first bar.

2. In combination, a key having a shank provided with a bar-actuating surface, a bar having a portion engageable by said surface to move in accordance with the movement of the key, a second bar having a portion adapted to restrain the first bar from movement by the key, a spring operable to move the second bar to position said portion in restraining position with relation to the first bar, a cam normally positioned to hold the second bar against the action of its spring to position said portion in nonrestraining position with relation to the first bar, said cam having a controlling arm, a spring for moving said cam from normal position, a lever, a spring normally maintaining the lever in an initial position, a slidable member engaging the cam arm and engaged by the lever in the initial position of the latter to hold the cam against the action of its spring to maintain the second bar in nonrestraining position, said slidable member being released by the lever when the latter is moved from its initial position, the released member permitting the cam to respond to the action of its spring to effect movement of the second bar to restraining position with relation to the first bar, said lever operating to reengage the slidable member when the lever is returned to its initial position.

3. In a calculating machine, means for temporarily locking the operating handle, comprising a main shaft having an operating handle, a ratchet fixedly mounted on the shaft, a pawl pivoted adjacent to the path of travel of the ratchet when turned by the shaft, a spring normally operating to move the pawl away from the path of travel of the ratchet, and mechanism operable independently of the main shaft and including a cam to be actuated by said mechanism to move the pawl against the action of its spring into engagement with the ratchet to prevent rotation of the main shaft, continued actuation of the cam releasing the pawl to be moved by its spring clear of the ratchet to free the main shaft.

4. In a calculating machine, means for temporarily locking the operating handle, comprising a main shaft having an operating handle, a ratchet fixedly mounted on the shaft, a rotatable hub having radial arms at its opposite ends, a stud carried at the extremity of one of the arms adjacent to the path of travel of the ratchet when turned by the shaft, a spring connected with the hub to turn the same with the arm carrying the stud positioned away from the path of travel of the ratchet, and mechanism operable independently of the main shaft and including a cam actuated by said mechanism to engage the other arm to turn the hub against the action of its spring to move the arm carrying the stud to engage the latter with the ratchet to prevent rotation of the main shaft, continued operation of said mechanism releasing the stud from the ratchet to free the main shaft.

5. In a calculating machine, the combination with an accumulator, spring operated total-setting mechanism acting successively from lower to higher order of said accumulator and a prime mover, of mechanism operable by said total-setting mechanism for automatically locking said prime mover against operation during operation of said total-setting mechanism.

6. In a calculating machine, the combination with an accumulator, spring operated total-setting mechanism acting successively from lower to higher order of said accumulator and a prime mover, of mechanism operable by said total-setting mechanism for automatically locking said prime mover against operation during operation of said total-setting mechanism and for automatically unlocking said prime mover when said total-setting mechanism has completed its action.

In testimony whereof I affix my signature.
HAROLD P. MIXER.